No. 848,339. PATENTED MAR. 26, 1907.
A. W. BENSON.
LUMBER CART.
APPLICATION FILED DEC. 16, 1905.
2 SHEETS—SHEET 1.
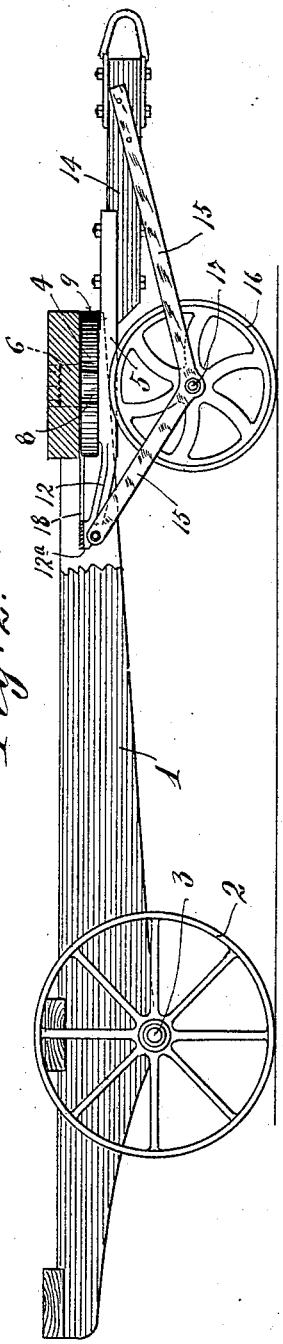
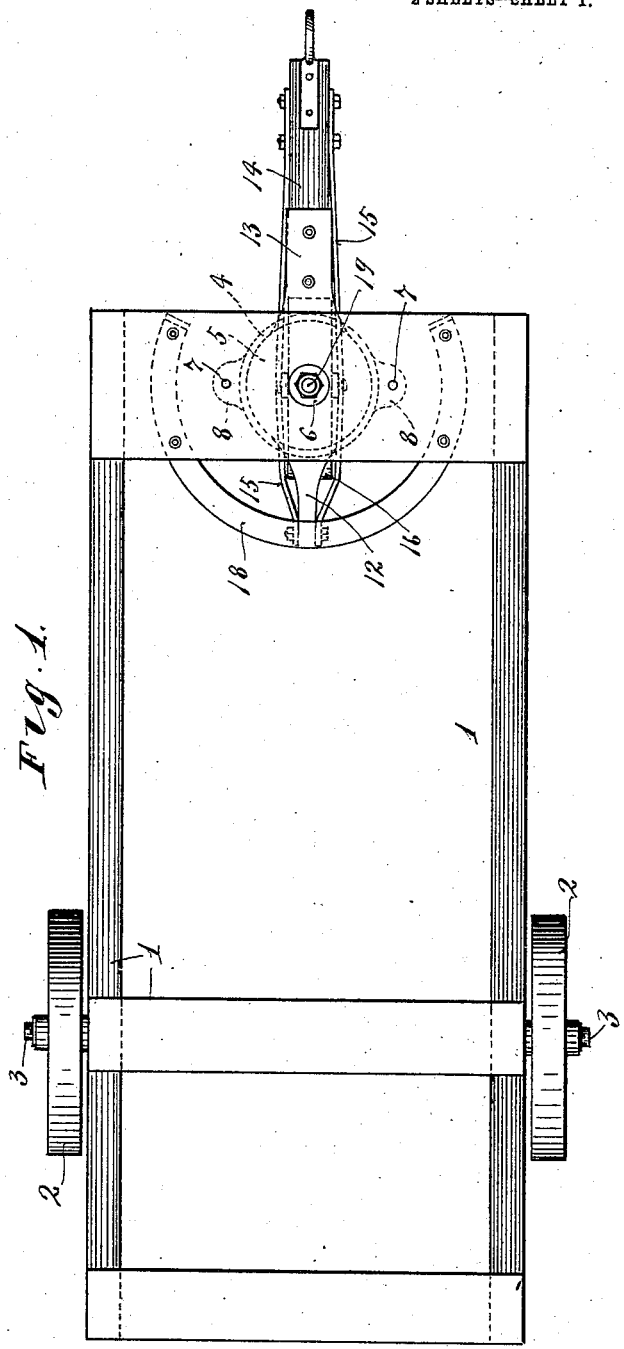
Witnesses
A. H. Opsahl.
E. W. Jeppesen.
Inventor
A. W. Benson.
By his Attorneys.
Williamson Mercham No. 848,339. PATENTED MAR. 26, 1907.
A. W. BENSON.
LUMBER CART.
APPLICATION FILED DEC. 16, 1905.

2 SHEETS—SHEET 2.

Witnesses
A. H. Opsahl.
E. W. Jeppesen.

Inventor.
A. W. Benson
By his Attorneys
Williamson & Merchant

UNITED STATES PATENT OFFICE.

ADOLPH W. BENSON, OF MINNEAPOLIS, MINNESOTA, ASSIGNOR TO A. W. BENSON MANUFACTURING COMPANY, OF MINNEAPOLIS, MINNESOTA, A CORPORATION OF MINNESOTA.

LUMBER-CART.

No. 848,339.      Specification of Letters Patent.      Patented March 26, 1907.

Application filed December 16, 1905. Serial No. 292,046.

*To all whom it may concern:*

Be it known that I, ADOLPH W. BENSON, a citizen of the United States, residing at Minneapolis, in the county of Hennepin and State of Minnesota, have invented certain new and useful Improvements in Lumber-Carts; and I do hereby declare the following to be a full, clear, and exact description of the invention, such as will enable others skilled in the art to which it appertains to make and use the same.

My invention relates particularly to lumber-carts, but generally to carts which have an arrangement whereby when connected to a train the several carts will trail or travel the same track in turning curves or corners.

This invention was especially designed as an improvement on the cart disclosed and claimed in the patent to W. A. Marshall, No. 660,020, issued of date October 16, 1900.

This invention is especially directed to the improvement of the center-bearing device of the cart, whereby greater strength and stability of the cart is obtained.

The invention is illustrated in the accompanying drawings, wherein like characters indicate like parts throughout the several views.

Figure 4:
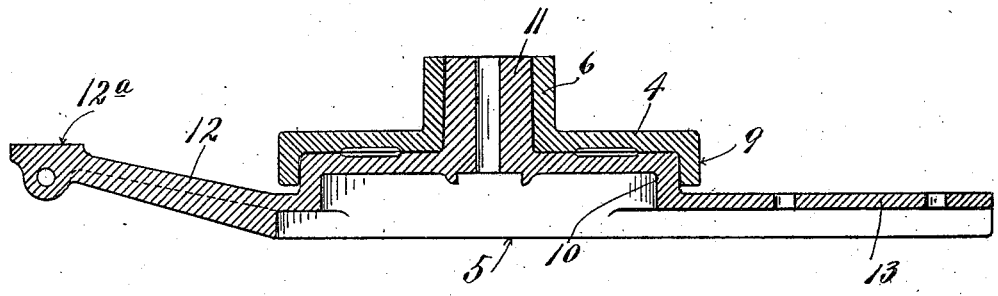
Figure 3:
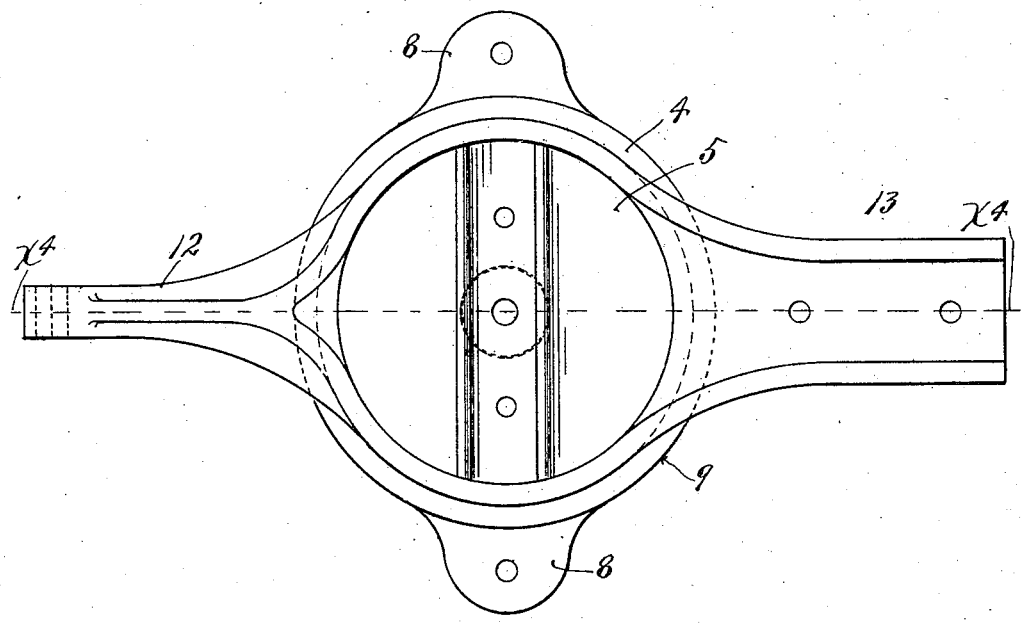

Referring to the drawings, Figure 1 is a plan view of the improved cart. Fig. 2 is a side elevation of the said cart, some parts being sectioned and some parts being broken away. Fig. 3 is a bottom plan view of the lower member of the fifth-wheel, and Fig. 4 is a section taken on the line $x^4 x^4$ of Fig. 3.

The numeral 1 indicates a rectangular frame which forms the body of the cart. The rear portion of this body-frame 1 is supported by wheels 2, loosely journaled on the ends of an axle 3, which in turn is rigidly secured to the side beams of said frame, a considerable distance forward of the rear end of said frame.

The center-bearing, which forms the pivotal connection between the forward truck of the cart and the forward end of the frame 1, is made up of two members 4 and 5, the former of which is provided with a sleeve-like bearing 6, that is seated in the transverse forward beam of said frame 1. Said upper member 4 is rigidly secured to the said forward beam of the frame 1 by means of bolts 7, passed through said beam and through lugs 8 on the sides of said member 4. Furthermore, said member 4 is provided with a depending annular flange 9, that coöperates with the bottom of said member 4 to form a bearing-socket that receives a raised lug portion 10 of the lower member 5. The said lower member 5 is formed with a central sleeve-like bearing-hub 11, that fits in the bearing-sleeve 6 of the upper member 4. Furthermore, the said lower member 5 is provided with a rearwardly-extended arm 12 and with a forwardly-extended arm 13, to which arm 13 a stub or short pole 14 is rigidly secured. The frame for the forward truck is formed by the lower member 5, by the pole 14, and by a pair of laterally-spaced metallic straps 15, which straps are secured at their forward ends to the pole 14 and at their rear ends to the arm 12 of said member 5. The front wheel 16 is journaled on a short axle or bolt 17, that extends from the one strap 15 to the other and is riveted or otherwise rigidly secured thereto.

The upper surface of the rear end of the arm 12 of the lower and relatively movable member of the center-bearing is formed with a flat bearing-surface $12^a$, that works frictionally against the under surface of the segmental bearing 18, which bearing 18 is rigidly secured to the under surface of the transverse front beam of the main frame 1 and extends through more than one hundred and eighty degrees. The engagement of the bearing-surface $12^a$ with the segmental bearing 18 extends the engagement between the members of the center-bearing to a very great distance from the pivotal axis thereof, and thus gives greater stability to the forward end of the cart and reduces the strain on the other pivotally-engaging portions of the center-bearing.

When the forward truck is turned at an angle of ninety degrees to the rear truck, a heavy load on the forward portion of the cart, especially if slightly heavier on one side than on the other of the pivotal axis of the forward truck or of the center-bearing, tends to produce a cramping action on the bearing members of the said center-bearing. As is evident, this cramping action is eliminated or greatly reduced by the extended arm 12 and bearing-segment 18. The arm 12, it will be seen, constitutes a part of the lower and pivotal member of the center-bearing, while the bearing-segment 18 constitutes a part of the upper and relatively fixed member of the said center-bearing. It will also be noted that the draft strains between the forward truck and the frame of the cart is distributed between the two concentric bearing-surfaces of the members 4 and 5 of the said center-bearing. A retaining-bolt 19, passed through the bearing-hub 11 of the member 5, serves to hold the members of the said center-bearing together, and hence prevents accidental separation of the forward truck from the frame of the cart.

The device described while simple and of small cost adds great strength to the cart and greatly improves the action of the center-bearing.

It will of course be understood that the cart above described may be made of various sizes and may, in fact, be made in small sizes and used as a toy. The forward truck of the cart may have two wheels, if desired.

What I claim, and desire to secure by Letters Patent of the United States, is as follows:

In a cart, the combination with a center-bearing member 4 rigidly secured to the cart-frame and having concentric bearing portions 6 and 9, of the segmental bearing 18 also rigidly secured to said frame, the movable bearing member 5 having the concentric portions 10 and 11 fitting respectively the bearing-surfaces 9 and 6 of said member 4, the rearwardly-extended arm 12 secured to said member 5 and having a bearing-surface 12ª engaging with said bearing-segment 18, and a pole 14 rigidly secured to said bearing member 5, substantially as described.

In testimony whereof I affix my signature in presence of two witnesses.

ADOLPH W. BENSON.

Witnesses:
   MALIE HOEL,
   F. D. MERCHANT